(12) United States Patent
Liu et al.

(10) Patent No.: US 10,477,237 B2
(45) Date of Patent: Nov. 12, 2019

(54) DECODER SIDE MOTION VECTOR REFINEMENT IN VIDEO CODING

(71) Applicant: Futurewei Technologies, Inc., Plano, TX (US)

(72) Inventors: Shan Liu, San Jose, CA (US); Wei Wang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/970,150

(22) Filed: May 3, 2018

(65) Prior Publication Data
US 2019/0020895 A1     Jan. 17, 2019

Related U.S. Application Data

(60) Provisional application No. 62/526,246, filed on Jun. 28, 2017.

(51) Int. Cl.
*H04N 19/573* (2014.01)
*H04N 19/513* (2014.01)
(Continued)

(52) U.S. Cl.
CPC ......... *H04N 19/573* (2014.11); *H04N 19/139* (2014.11); *H04N 19/176* (2014.11);
(Continued)

(58) Field of Classification Search
CPC .. H04N 19/139; H04N 19/176; H04N 19/186; H04N 19/44; H04N 19/513; H04N 19/573; H04N 19/577; H04N 19/61
(Continued)

(56) References Cited

U.S. PATENT DOCUMENTS

| 8,526,495 B2 | 9/2013 | Liu et al. |
| 9,049,452 B2 | 6/2015 | Liu et al. |

(Continued)

FOREIGN PATENT DOCUMENTS

| CN | 102685504 A | 9/2012 |
| CN | 105530516 A | 4/2016 |

OTHER PUBLICATIONS

"Series H: Audiovisual and Multimedia Systems, Infrastructure of audiovisual services—Coding of moving video, High efficiency video coding," ITU-T, H.265, Dec. 2016, 664 pages.

(Continued)

*Primary Examiner* — Dominic D Saltarelli
(74) *Attorney, Agent, or Firm* — Conley Rose, P.C.

(57) ABSTRACT

A method of coding is provided. The method includes comparing a cost between a bilateral reference block and each of a plurality of first and second reference block candidates in the first and second reference pictures to determine first and second refined motion vectors. The first and second reference block candidates are determined based on a step size selected from a plurality of available step sizes. The method also includes selecting a first refined reference block in the first reference picture based on the first refined motion vector and a second refined reference block in the second reference picture based on the second refined motion vector, determining a prediction block based on the first refined reference block and the second refined reference block, and displaying an image generated using the prediction block.

20 Claims, 6 Drawing Sheets

(51) Int. Cl.
*H04N 19/186* (2014.01)
*H04N 19/61* (2014.01)
*H04N 19/577* (2014.01)
*H04N 19/139* (2014.01)
*H04N 19/176* (2014.01)
*H04N 19/44* (2014.01)

(52) U.S. Cl.
CPC ........... *H04N 19/186* (2014.11); *H04N 19/44* (2014.11); *H04N 19/513* (2014.11); *H04N 19/577* (2014.11); *H04N 19/61* (2014.11)

(58) Field of Classification Search
USPC .......................... 375/240.15, 240.21, 240.25
See application file for complete search history.

(56) References Cited

U.S. PATENT DOCUMENTS

| | | | |
|---|---|---|---|
| 9,363,511 B2 | 6/2016 | Zhang et al. | |
| 9,510,012 B2 | 11/2016 | Liu et al. | |
| 9,769,472 B2 | 9/2017 | Liu et al. | |
| 9,788,019 B2 | 10/2017 | Liu et al. | |
| 9,813,726 B2 | 11/2017 | Liu et al. | |
| 2010/0208817 A1* | 8/2010 | Jeon | H04N 19/105 375/240.15 |
| 2011/0176611 A1 | 7/2011 | Huang et al. | |
| 2012/0075535 A1 | 3/2012 | Van Beek | |
| 2014/0086323 A1 | 3/2014 | Chuang et al. | |
| 2015/0172719 A1 | 6/2015 | Guo et al. | |
| 2015/0365692 A1 | 12/2015 | Liu et al. | |
| 2016/0142706 A1 | 5/2016 | Chuang et al. | |
| 2017/0272745 A1 | 9/2017 | Liu et al. | |
| 2017/0353730 A1 | 12/2017 | Liu et al. | |
| 2017/0374369 A1 | 12/2017 | Chuang et al. | |
| 2018/0077424 A1 | 3/2018 | Lin et al. | |
| 2018/0376137 A1* | 12/2018 | Jun | H04N 19/105 |
| 2019/0191178 A1* | 6/2019 | Lee | H04N 19/52 |

OTHER PUBLICATIONS

Liu, S., et al., "Remove Partition Size N×N," JCTVC-D432, Jan. 20-28, 2011, 7 pages.
Liu, S., et al., "Evaluations and suggestions for TU representation," JCTVC-E083, WG11 No. m19597, Mar. 16-23, 2011, 8 pages.
Zhang, X., et al., "Method for deriving Chroma QP from Luma QP," JCTVC-F277, Jul. 14-22, 2011, 6 pages.
Liu, S., et al., "Rectangular (2N×N and N×2N) Intra Prediction," JCTVC-G135, WG11 No. 21687, Nov. 21-30, 2011, 6 pages.
Zhang, X., et al., "Method and syntax for quantization matrices representation," JCTVC-G152, Nov. 21-30, 2011, 8 pages.
Liu, S., et al., "Support of ChromaQPOffset in HEVC," JCTVC-G509r1, Nov. 21-30, 2011, 8 pages.
Oudin, S., et al., "Harmonization of the prediction and partitioning mode binarization of P and B slices," JCTVC-G1042, Nov. 21-30, 2011, 4 pages.
Cao, X., et al., "AHG16 Unification of SDIP and NSQT," JCTVC-H0347, Feb. 1-10, 2012, 9 pages.
Kim, J., et al., "nonTE5: Assigning intra prediction mode to inter layer intra predicted blocks in enhance layer," JCTVC-L0239, Jan. 14-23, 2013, 5 pages.
Lai, P., et al., "SCE3.4 Generalized Combined Prediction," JCTVC-M0221, Apr. 18-26, 2013, 9 pages.
Xu, X., et al., "On unification of intra block copy and inter-picture motion compensation," JCTVC-Q0132, Jan. 9-17, 2014, 14 pages.
Zhang, X., et al., "Intra mode coding with fixed length binarization," JCTVC-H0435, WG11 No. m23311, Nov. 21-30, 2011, 5 pages.
Zhang, X., et al., "Non-CE6: Intra mode coding with fixed length binarization," JCTVC-H0435r1, WG11 No. m23311, Feb. 1-10, 2012, 5 pages.

Kim, J., et al., "Assigning Intra Prediction Mode to ILTP block," JCTVC-K0253, JCTVC-L0253, MediaTek, LG Electronics, Jan. 14-23, 7 pages.
Kim, J., et al., "nonTE5: Assigning intra prediction mode to inter layer intra predicted blocks in enhance layer," JCTVC-L0239r1, Jan. 14-23, 2013, 6 pages.
Lai, P., et al., "SCE3.4 Generalized Combined Prediction," Apr. 18-26, 2013, JCTVC-M0221r1, Apr. 18-26, 2013, 10 pages.
Lai, P., et al., "Non-SCE3.4: Simplified Generalized Combined Prediction," JCTVC-M0222, Apr. 2013, 10 pages.
Lai, P., et al., "Non-SCE3.4: Simplified Generalized Combined Prediction," JCTVC-M0222r1, Apr. 18-26, 2013, 9 pages.
Seregin, V., et al., "Uni-prediction for combined inter mode," JCTVC-M0445, Apr. 18-26, 2013, 3 pages.
Seregin, V., et al., "Uni-prediction for combined inter mode," JCTVC-M0445r1, Apr. 18-26, 2013, 7 pages.
Seregin, V., et al., "Uni-prediction for combined inter mode," JCTVC-M0445r2, Apr. 18-26, 2013, 11 pages.
Xu, X., et al., "On unification of intra block copy and inter-picture motion compensation," JCTVC-Q0132v2, MediaTek, Mar. 27-Apr. 4, 2014, 15 pages.
Xu, X., et al., "On unification of intra block copy and inter-picture motion compensation," JCTVC-Q0132v5, Jan. 9-17, 2014, 14 pages.
Xu, X., et al., "Non-CE2: Intra BC merge mode with default candidates," JCTVC-S0123r1, Oct. 17-24, 2014, 7 pages.
Xu, X., "JCTVC-S0123: Non-CE2: Intra BC Merge Mode with Default Candidates," JCTVC-S0123, Oct. 17-24, 12 pages.
Xu, X., et al., "CE2 Test 3.2: Intra BC merge mode with default candidates," JCTVC-T0073, Feb. 10-18, 2015, 6 pages.
Lai, P., et al., "Combined Temporal and Inter-layer Prediction for Scalable Video Coding using HEVC," PCS, 2013, pp. 117-120.
Liu, S., et al., "Global/Local Motion-Compensated Frame Interpolation for Low Bitrate Video," 2000, 12 pages.
Liu, S., et al., "Non-linear Motion-compensated Interpolation for Low Bit Rate Video," 2000, 11 pages.
Liu, S., et al., "MCI-embedded Motion Compensated Prediction for Quality Enhancement for Frame Interpolation," 2001, 11 pages.
Liu, S., et al., "Complexity Reduction of Joint Temporal-Spatial Bit Allocation Using R—D Models for Video Streaming," ICIP, 2002, pp. 729-732.
Liu, S., et al., "Joint Temporal-Spatial Rate Control with Approximating Rate-Distortion Models," Visual Communications and Image Processing, 2002, pp. 746-755.
Liu, S., et al., "Joint Temporal-Spatial Rate Control for Adaptive Video Transcoding," ICME, 2003, pp. 225-228.
Liu, S., et al., "Hybrid global-local motion compensated frame interpolation for low bit rate video coding," J. Vis. Commun. Image R. 14, 2003, pp. 61-79.
Liu, S., et al., "Efficient MPEG-2 to MPEG-4 Video Transcoding," Image and Video Communications and Processing, vol. 5022, 2003, pp. 186-195.
Liu, S., et al., "Joint Temporal-Spatial Bit Allocation for Video Coding with Dependency," IEEE Transactions on Circuits and Systems for Video Technology, vol. 15, No. 1, Jan. 2005, pp. 15-26.
Liu, S., "Video Prediction Block Structure and the Emerging High Efficiency Video Coding Standard," Asia-Pacific Signal & Information Processing Association Annual Summit and Conference, Dec. 3-6, 2012, 4 pages.
Liu, S., et al., "Rectangular Partitioning for Intra Prediction in HEVC," IEEE Visual Communications and Image Processing, Nov. 27-30, 2012, 6 pages.
Lou, J., et al., "Complexity and Memory Efficient GOP Structures Supporting VCR Functionalities in H.264/AVC," IEEE International Symposium on Circuits and Systems, May 18-21, 2008, pp. 636-639.
Lou, J., "Trick-Play Optimization for H.264 Video Decoding," Mitsubishi Electric Research Laboratories, TR2010-076, Sep. 2010, 15 pages.
Zhang, X., "Intra Mode Coding in HEVC Standard," IEEE Visual Communications and Image Processing, Nov. 27-30, 2012, 6 pages.
Xu, et al., "Decoder-Side Motion Vector Refinement Based on Bilateral Template Matching," Joint Video Exploration Team (JVET)

(56) References Cited

OTHER PUBLICATIONS of ITU-T SG 16 WP 3 and ISO/IEC JTC 1/SC 29/WG 11, 4th Meeting: Chengdu, CN, Oct. 15-21, 2016, JVET-D0029, 4 pages.

Alshin, et al., "EE3: Cross-check for Decoder-Side Motion Vector Refinement Based on Bilateral Template Matching," Joint Video Exploration Team (JVET) of ITU-T SG 16 WP 3 and ISO/IEC JTC 1/SC 29/WG 11, 5th Meeting: Geneva, CH, Jan. 12-20, 2017, JVET-E0049, 2 pages.

Xu, et al., "EE3: Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-E0052, 4 pages.

Foreign Communication From a Counterpart Application, PCT Application No. PCT/CN2018/090739, English Translation of International Search Report dated Sep. 3, 2018, 5 pages.

Foreign Communication From a Counterpart Application, PCT Application No. PCT/CN2018/090739, English Translation of Written Opinion dated Sep. 3, 2018, 4 pages.

\* cited by examiner

DECODER SIDE MOTION VECTOR REFINEMENT IN VIDEO CODING

CROSS-REFERENCE TO RELATED APPLICATIONS

This patent application claims the benefit of U.S. Provisional Patent Application No. 62/526,246, filed Jun. 28, 2017, by Shan Liu, et al., and titled "Decoder Side Motion Vector Refinement in Video Coding," the teaching and disclosure of which is hereby incorporated in its entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method of coding implemented by a decoding device, comprising: determining a first reference block in a first reference picture based on a first motion vector corresponding to a current block in a current picture; determining a second reference block in a second reference picture based on a second motion vector corresponding to the current block in the current picture; generating a bilateral reference block based on the first reference block and the second reference block; comparing a cost between the bilateral reference block and each of a plurality of first reference block candidates in the first reference picture to determine a first refined motion vector, wherein the first reference block candidates are determined based on a step size selected from a plurality of available step sizes; comparing a cost between the bilateral reference block and each of a plurality of second reference block candidates in the second reference picture to determine a second refined motion vector, wherein the second reference block candidates are determined based on the step size selected from the plurality of available step sizes; selecting a first refined reference block in the first reference picture based on the first refined motion vector and a second refined reference block in the second reference picture based on the second refined motion vector; determining a prediction block based on the first refined reference block and the second refined reference block; and displaying, on a display of an electronic device, an image generated using the prediction block.

Optionally, in any of the preceding aspects, another implementation of the aspect provides that the plurality of available step sizes includes two or more luma sample offsets, wherein the luma sample offsets comprise fractional offsets, integer offsets, or a combination of fractional and integer offsets. Optionally, in any of the preceding aspects, another implementation of the aspect provides that the plurality of available step sizes comprises $\frac{1}{8}$, $\frac{1}{4}$, $\frac{1}{2}$, 1, and N luma sample offsets, where N is any positive integer. Optionally, in any of the preceding aspects, another implementation of the aspect provides that the step size is any one of $\frac{1}{8}$, $\frac{1}{4}$, $\frac{1}{2}$, 1, and N luma sample offsets, where N is any positive integer. Optionally, in any of the preceding aspects, another implementation of the aspect provides that the step size is obtained from a codec default. Optionally, in any of the preceding aspects, another implementation of the aspect provides that the step size is configured to be obtained from any one of a sequence parameter set (SPS) level of a bitstream, a picture parameter set (PPS) level of the bitstream, a slice header, coding tree unit (CTU) syntax, or coding unit (CU) syntax. Optionally, in any of the preceding aspects, another implementation of the aspect provides that the plurality of first reference block candidates and the plurality of second reference block candidates are determined as follows:

$MV0x'=MV0x+k*\text{step\_size};$ $MV0y'=MV0y+k*\text{step\_size};$ $MV1x'=MV1x+k*\text{step size};$ $MV1y'=MV1y+k*\text{step\_size};$ where MV0x and MV1x indicate a motion vector in an x-direction, MV0y and MV1y indicate the motion vector in a y-direction, k is an integer used to represent coordinates, and step_size is the step size. Optionally, in any of the preceding aspects, another implementation of the aspect provides that one or more of the first motion vector and the second motion vector are rounded prior to the first refined motion vector and the second refined motion vector being determined.

In an embodiment, the disclosure includes a method of coding implemented by a decoding device, comprising: receiving a first motion vector and a second motion vector from an encoding device; determining a first precision based on the first motion vector and a second precision based on the second motion vector; setting a first step size based on the first precision and a second step size based on the second precision; comparing a cost between a bilateral reference block and each of a plurality of first reference block candidates in a first reference picture to determine a first refined motion vector, wherein the plurality of first reference block candidates are determined based on the first step size; comparing a picture the bilateral reference block and each of a plurality of second reference block candidates in a second reference block to determine a second refined motion vector, wherein the plurality of second reference block candidates are determined based on the second step size; selecting a first refined reference block in a first reference picture based on the first refined motion vector and a second refined reference block in a second reference picture based on the second refined motion vector; determining a prediction block based on the first refined reference block and the second refined reference block; and displaying, on a display of an electronic device, an image generated using the prediction block.

Optionally, in any of the preceding aspects, another implementation of the aspect provides that the first precision is a finest precision of the first motion vector and the second precision is a finest precision of the second motion vector. Optionally, in any of the preceding aspects, another implementation of the aspect provides that the first precision is a coarsest precision of the first motion vector and the second precision is a coarsest precision of the second motion vector. Optionally, in any of the preceding aspects, another implementation of the aspect provides that the first precision is a finest precision of the first motion vector and the second motion vector, and wherein the second precision is the finest precision of the first motion vector and the second motion vector. Optionally, in any of the preceding aspects, another implementation of the aspect provides that the first precision is a coarsest precision of the first motion vector and the second motion vector, and wherein the second precision is the coarsest precision of the first motion vector and the second motion vector. Optionally, in any of the preceding aspects, another implementation of the aspect provides that the first step size and the second step size are both one of ⅛, ¼, ½, 1, and N luma sample offsets, where N is any positive integer. Optionally, in any of the preceding aspects, another implementation of the aspect provides that the first step size and the second step size correspond to a finest precision of the first motion vector and the second motion vector in both an x-direction and a y-direction. Optionally, in any of the preceding aspects, another implementation of the aspect provides that the first step size and the second step size correspond to a coarsest precision of the first motion vector and the second motion vector in both an x-direction and a y-direction.

In an embodiment, the disclosure includes a coding device, comprising: a memory storing instructions; and a processor coupled to the memory, the processor configured to execute the instructions stored in the memory to cause the processor to: determine a first reference block in a first reference picture based on a first motion vector corresponding to a current block in a current picture; determine a second reference block in a second reference picture based on a second motion vector corresponding to the current block in the current picture; generate a bilateral reference block based on the first reference block and the second reference block; compare a cost between the bilateral reference block and each of a plurality of first reference block candidates in the first reference picture to determine a first refined motion vector, wherein the first reference block candidates are determined based on a step size selected from a plurality of available step sizes; compare a cost between the bilateral reference block and each of a plurality of second reference block candidates in the second reference picture to determine a second refined motion vector, wherein the second reference block candidates are determined based on the step size selected from the plurality of available step sizes; select a first refined reference block in the first reference picture based on the first refined motion vector and a second refined reference block in the second reference picture based on the second refined motion vector; determine a prediction block based on the first refined reference block and the second refined reference block; and a display coupled to the processor, the display configured to display an image generated using the prediction block.

Optionally, in any of the preceding aspects, another implementation of the aspect provides that the plurality of available step sizes includes two or more luma sample offsets, wherein the luma sample offsets comprise fractional offsets, integer offsets, or a combination of fractional and integer offsets. Optionally, in any of the preceding aspects, another implementation of the aspect provides that the plurality of available step sizes comprises ⅛, ¼, ½, 1, and N luma sample offsets, where N is any positive integer. Optionally, in any of the preceding aspects, another implementation of the aspect provides that the step size is any one of ⅛, ¼, ½, 1, and N luma sample offsets, where N is any positive integer.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
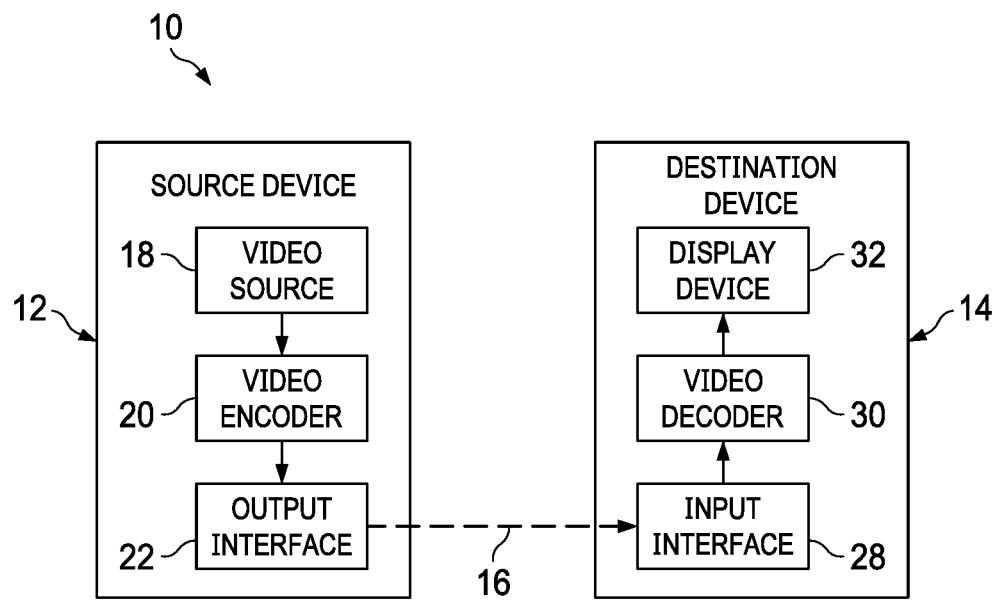
FIG. 1 is a block diagram illustrating an example coding system that may utilize bi-lateral prediction techniques.

FIG. 1 is a block diagram illustrating an example coding system 10 that may utilize bidirectional prediction techniques. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 and/or the video decoder 30 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for bidirectional prediction may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
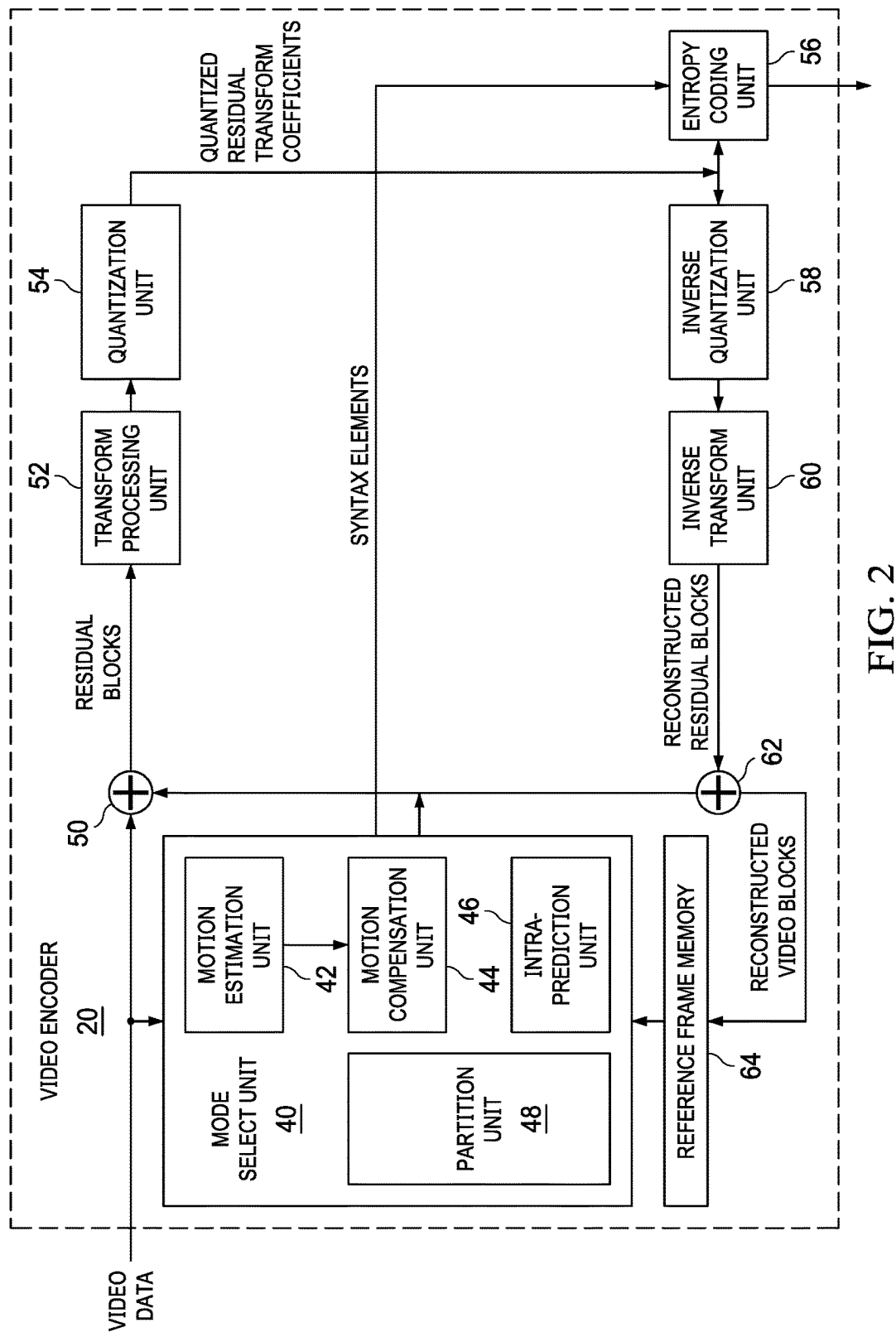
FIG. 2 is a block diagram illustrating an example video encoder that may implement bi-lateral prediction techniques.

FIG. 2 is a block diagram illustrating an example of video encoder 20 that may implement bidirectional prediction techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quadtree data structure indicative of partitioning of a LCU into sub-CUs. Leaf-node CUs of the quadtree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. In an embodiment, a CU, PU, or TU can be square or non-square (e.g., rectangular) in shape.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
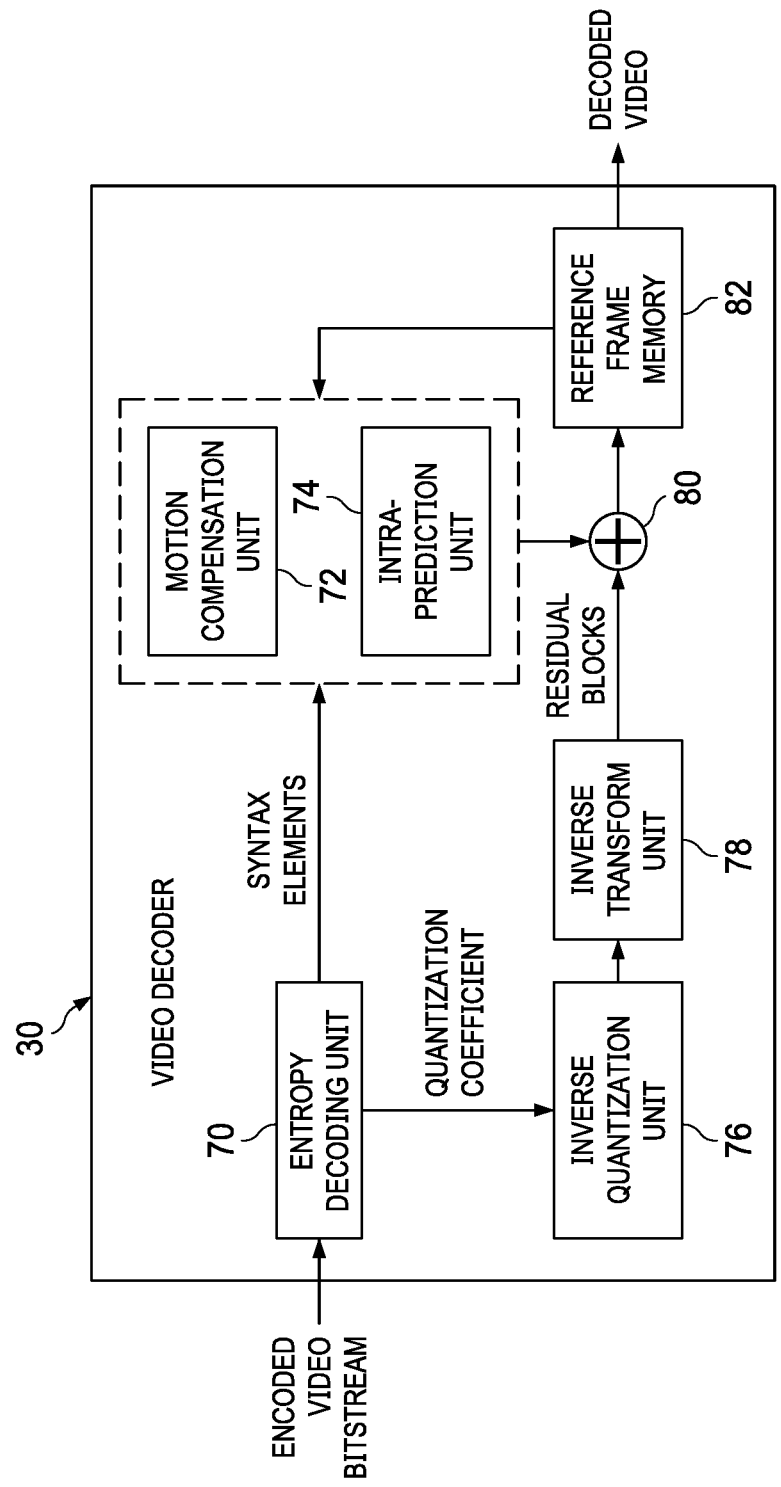
FIG. 3 is a block diagram illustrating an example of a video decoder that may implement bi-lateral prediction techniques.

FIG. 3 is a block diagram illustrating an example of video decoder 30 that may implement bidirectional prediction techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

As will be appreciated by those in the art, the coding system 10 of FIG. 1 is suitable for implementing various video coding or compression techniques. Some video compression techniques, such as inter prediction, intra prediction, and loop filters, have demonstrated to be effective. Therefore, the video compression techniques have been adopted into various video coding standards, such as H.264/AVC and H.265/HEVC.

Various coding tools such as adaptive motion vector prediction (AMVP) and merge mode (MERGE) are used to predict motion vectors (MVs) and enhance inter prediction efficiency and, therefore, the overall video compression efficiency.

The MVs noted above are utilized in bi-prediction. In a bi-prediction operation, two prediction blocks are formed. One prediction block is formed using a MV of list0 (referred to herein as MV0). Another prediction block is formed using a MV of list1 (referred to herein as MV1). The two prediction blocks are then combined (e.g., averaged) in order to form a single prediction signal (e.g., a prediction block or a predictor block).

Figure 4:
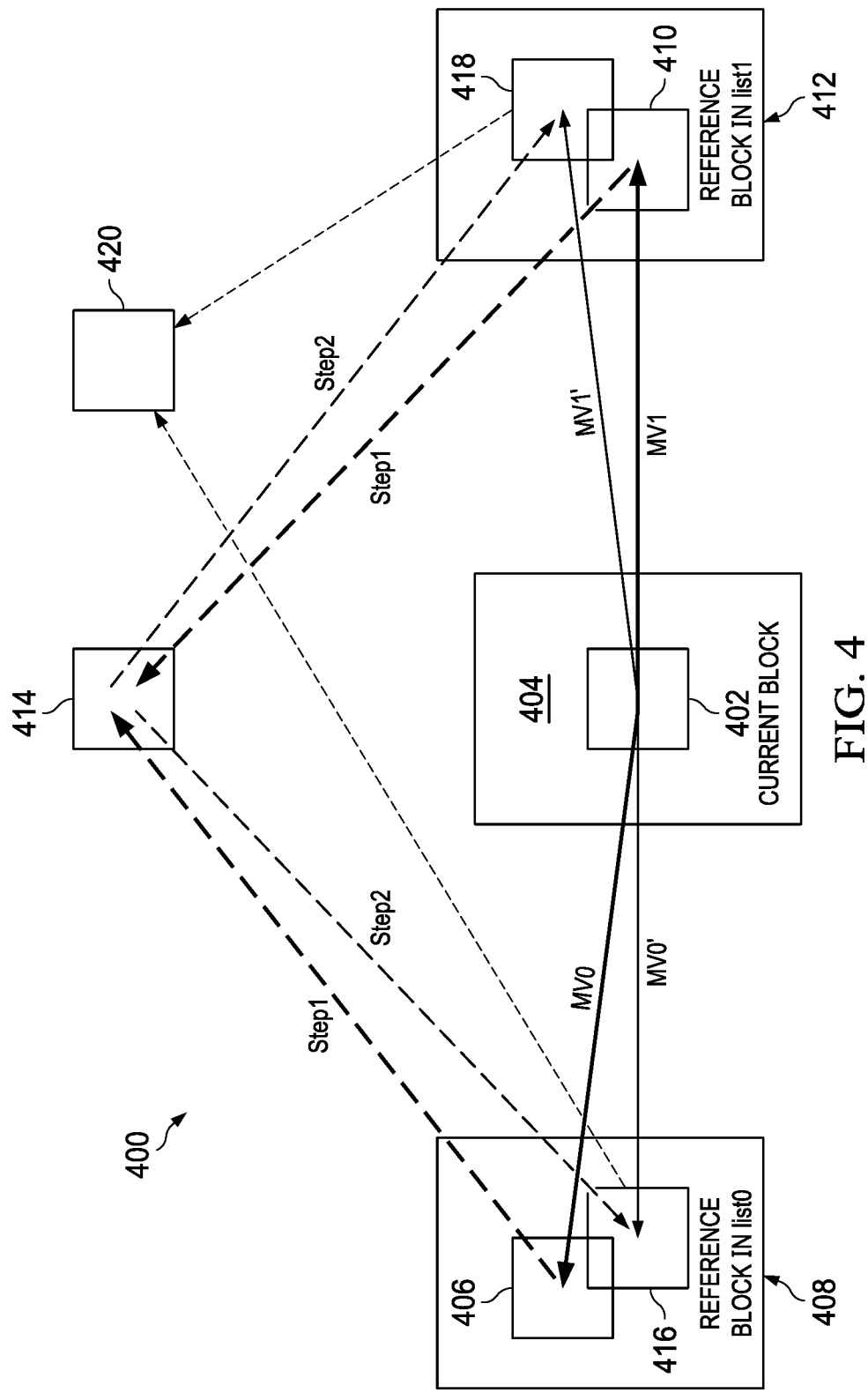
FIG. 4 a graphical illustration of an embodiment of a decoder-side motion vector refinement (DMVR) method.

FIG. 4 is a graphical illustration of an embodiment of a DMVR method 400. In an embodiment, the DMVR method 400 begins with a current block 402 in a current picture 404. In an embodiment, the current block may be square or non-square in shape. The current picture 404 may also be referred to as a current region, image, tile, and so on. As shown, MV0 points to a first reference block 406 in a first reference picture 408 and MV1 points to a second reference block 410 in a second reference picture 412. In an embodiment, the first reference block 406 is before the current block 402 in time, sequence, decoding order, or some other parameter. In an embodiment, the second reference block 410 is ahead of the current block 402 in time, sequence, decoding order, or some other parameter. The first reference block 406 and the second reference block 410 may be referred to herein as initial reference blocks.

The first reference block 406 and the second reference block 410 are combined to form the bi-lateral template block 414. In an embodiment, the first reference block 406 and the second reference block 410 are averaged together to generate the bi-lateral template block 414. In an embodiment, the bi-lateral template block 414 is generated as the weighted combination of the first reference block 406 and the second reference block 410.

Once the bi-lateral template block 414 has been generated, a template matching operation is performed. The template matching operation involves calculating a cost between the bi-lateral template block 414 and each candidate reference block in the sample region around the first reference block 406 and a cost between the bi-lateral template block 414 and each candidate reference block in the sample region around the second reference block 410. In an embodiment, the potential reference block that yields the lowest cost (e.g., minimum template cost) determines which reference block in each sample region will serve as a refined reference block (a.k.a., a revised reference block). In an embodiment, the cost is determined using a SAD. Other cost measures may be utilized in practical applications.

In the example of FIG. 4, the first refined reference block 416 in the first reference picture 408, which is pointed to by MV0', resulted in the lowest cost, and the second refined reference block 418 in the second reference picture 412, which is pointed to by MV1', offered the lowest cost. In an embodiment, the first refined reference block 416 and the second refined reference block 418 replace the first reference block 406 and the second reference block 410, respectively.

Thereafter, a prediction block 420 is generated using the first refined reference block 416 and the second refined reference block 418. The prediction block 420 may be referred to as a predictor block or the final bi-prediction results. Once generated, the prediction block 420 may be used to generate an image for display on the display of an electronic device (e.g., smart phone, tablet device, laptop computer, etc.)

The DMVR method 400 may be applied for the merge mode of bi-prediction with one MV from a reference picture in the past and another from a reference picture in the future without having to transmit additional syntax elements. The DMVR method 400 is not applied when local illumination compensation (LIC), affine motion, frame-rate up-conversion (FRUC), or CU merge candidate is enabled for a CU in the Joint Exploration Model (JEM) reference software.

In the JEM reference software, nine MV candidates (which will point to nine candidate reference blocks) are searched for each reference block in a reference picture (e.g., for each list). The nine MV candidates include an original MV pointing to the reference block (e.g., reference block 406 or reference block 410) and the eight MVs pointing to reference blocks around the reference block with one luma sample offset relative to the original MV in either a horizontal direction, a vertical direction, or both. However, using MV candidates having a one luma sample offset relative to the original MV may not provide the best MV candidate.

Disclosed herein are methods for generating refined motion vector information at the decoder side. In existing solutions, a motion vector refinement search is implemented using a fixed step size of one. In contrast, the present disclosure presents methods that use different and adaptive motion vector refinement search step sizes to achieve higher coding efficiency. More specifically, the proposed methods utilize a fixed step size selected from a plurality of available step sizes. The proposed methods also use an adaptive fractional step size to derive refined motion vector candidates. Depending on the content of the video, MV0 and MV1 may point to either integer positions or sub-pel positions like ½, ¼, or ⅛, and so on. The present disclosure also presents methods to enable efficient motion vector refinement by selecting MV candidates in the DMVR context based on the precisions of MV0 and MV1.

In an embodiment, a fixed step size is used for motion vector refinement search. For example, the step size may be fixed to ⅛, ½, ¼, 1, or N luma samples, where N is a positive integer. Thus, the step size may be selective from a plurality of available step sizes. The fixed step size may be set by codec default, or signaled in a sequence parameter set (SPS), a picture parameter set (PPS), a slice header, a coding tree unit (CTU) syntax, or a CU syntax.

In an embodiment, the position of the search (or motion vector candidate check) points are calculate as follows.

$$MV0x'=MV0x+k*\text{step\_size}; \quad (1)$$

$$MV0y'=MV0y+k*\text{step\_size}; \quad (2)$$

$$MV1x'=MV1x+k*\text{step\_size}; \quad (3)$$

$$MV1y'=MV1y+k*\text{step\_size}; \quad (4)$$

where MV0x and MV1x indicate a motion vector in an x-direction, MV0y and MV1y indicate the motion vector in a y-direction, k is an integer used to represent coordinates, and step_size is the step size. By way of example, the k in equations (1) and (2) may be 0 and 1, respectively, to represent the coordinates (0,1). The coordinates (0,1) may represent or point to a reference block immediately to the right of an original reference block. Likewise, the coordinates (1,0) may represent or point to a reference block immediately above the original reference block. Using formulas (1)-(4), a set of nine motion vector candidates may be checked. By way of example, when the motion vector MV0 or MV1 is (¼, ¾) and the step size is ½, then the search points MV0' or MV1' may be (¾, 5/4), (−¼, ¼), and so on.

In an embodiment, the motion vector MV0 and MV1 are rounded to the precision of the step size before the calculation of MV0' and MV1'. For example, if the motion vector MV0 or MV1 is (¼, ¾) and step size is ½, then the motion vector MV0 or MV1 is first rounded to ½-pel precision, e.g. (½, 1). Note that here rounding may be rounding up or down. Then, the search points MV0' or MV1' are calculated using above equations (1)-(4) and could be (1, 3/2), (0, ½), (−½, 0), and so on. In an embodiment, a starting motion vector is first rounded to integer-pel precision, e.g. (0, 1) for the same initial motion vector (¼, ¾) when the step size is 1. Then, the search points for refinement are calculated using above equations (1)-(4) and could be (1, 2), (2, 3), (−1, 0), and so on.

In an embodiment, the motion vector MV0 and MV1 are rounded to a specific precision before the calculation of MV0' and MV1'. The specific precision may be predefined or signaled in the SPS, the PPS, slice header, CTU syntax, or CU syntax.

Disclosed herein is also a method of using an adaptive step size for a motion vector refinement search. In an embodiment, the step size is determined according to the precision of MV0 and the precision of MV1.

In an embodiment, the motion vector refinement search step size for MV0 is set to be the precision of MV0, and the motion vector refinement search step size for MV1 is set to be the precision of MV1. In an embodiment, the precision of MV0 is the finest precision of MV0x and MV0y, and the precision of MV1 is the finest precision of MV1x and MV1y. For example, when the precision of MV0 is (¼, 1), then the refinement search step size for this MV is ¼. As another example, when the precision of MV1 is (⅛, ¾), then the refinement search step size for this MV is ⅛.

In an embodiment, the precision of MV0 is the coarsest precision of MV0x and MV0y, and the precision of MV1 is the coarsest precision of MV1x and MV1y. For example, when the precision of MV1 is (¾, 1), then the refinement search step size for this MV is 1. As another example, when the precision of MV1 is (⅛, ¾), then the refinement search step size for this MV is ¾.

In an embodiment, the motion vector refinement search step size for MV0 and MV1 are set to be the same. In an embodiment, the motion vector refinement search step size for MV0 is different from the motion vector refinement search step size for MV1. In an embodiment, the step size is set to be the finest precision of MV0x, MV0y, MV1x, and MV1y. For example, when the precision of MV0x is ¼, the precision of MV0y is ¼, the precision of MV1x is ¾, and the precision of MV1y is ⅛, then the refinement search step size for MV is ⅛.

In an embodiment, the step size is set to be the coarsest precision of MV0x, MV0y, MV1x, and MV1y. For example, when the precision of MV0x is ¼, the precision of MV0y is ¼, the precision of MV1x is ¾, and the precision of MV1y is ⅛, then the refinement search step size for MV is ¾.

In an embodiment, the step size is set to be one of the precisions of MV0x, MV0y, MV1x and MV1y. For example, when the precision of MV0x is ¼, the precision of MV0y is 1, the precision of MV1x is ¾, and the precision of MV1y is ⅛, then the refinement search step size for MV is any one of ¼, 1, ¾, and ⅛.

In an embodiment, more than one step size is used in motion vector refinement search, where an initial motion vector (e.g., MV0) with a certain precision is refined by using one step size for the refinement search while another initial motion vector (e.g., MV1) with another certain precision is refined by using another step size for the refinement search.

In one embodiment, initial motion vectors which fall on sub-pel positions (e.g., with sub-pel precisions) use a sub-pel (e.g., ½ or ¼) step size for the refinement search. Initial motion vectors which fall on integer-pel positions (e.g., integer-pel precisions) use integer-pel (e.g., 1-pel or 4-pel) step size for refinement search.

In an embodiment, a rounding process as described herein may be applied when the initial motion vector precision is smaller (e.g., finer) than the refinement search step size.

Figure 5:
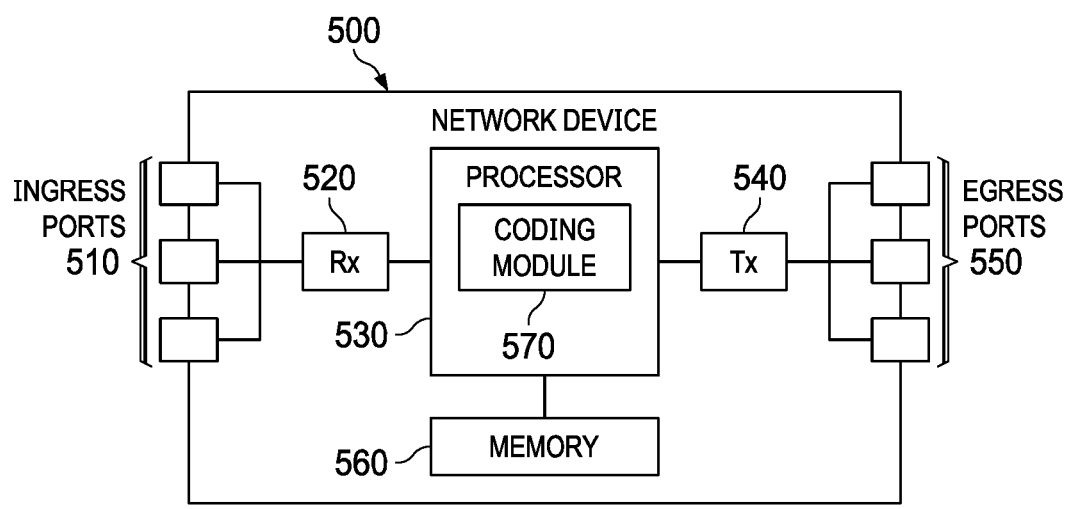
FIG. 5 is a schematic diagram of a network device.

FIG. 5 is a schematic diagram of a network device 500 (e.g., a coding device) according to an embodiment of the disclosure. The network device 500 is suitable for implementing the disclosed embodiments as described herein. In an embodiment, the network device 500 may be a decoder such as video decoder 30 of FIG. 1 or an encoder such as video encoder 20 of FIG. 1. In an embodiment, the network device 500 may be one or more components of the video decoder 30 of FIG. 1 or the video encoder 20 of FIG. 1 as described above.

The network device 500 comprises ingress ports 510 and receiver units (Rx) 520 for receiving data; a processor, logic unit, or central processing unit (CPU) 530 to process the data; transmitter units (Tx) 540 and egress ports 550 for transmitting the data; and a memory 560 for storing the data. The network device 500 may also comprise optical-to-electrical (OE) components and electrical-to-optical (EO) components coupled to the ingress ports 510, the receiver units 520, the transmitter units 540, and the egress ports 550 for egress or ingress of optical or electrical signals.

The processor 530 is implemented by hardware and software. The processor 530 may be implemented as one or more CPU chips, cores (e.g., as a multi-core processor), FPGAs, ASICs, and DSPs. The processor 530 is in communication with the ingress ports 510, receiver units 520, transmitter units 540, egress ports 550, and memory 560. The processor 530 comprises a coding module 570. The coding module 570 implements the disclosed embodiments described above. For instance, the coding module 570 implements, processes, prepares, or provides the various coding operations. The inclusion of the coding module 570 therefore provides a substantial improvement to the functionality of the network device 500 and effects a transformation of the network device 500 to a different state. Alternatively, the coding module 570 is implemented as instructions stored in the memory 560 and executed by the processor 530.

The memory 560 comprises one or more disks, tape drives, and solid-state drives and may be used as an over-flow data storage device, to store programs when such programs are selected for execution, and to store instructions and data that are read during program execution. The memory 560 may be volatile and/or non-volatile and may be read-only memory (ROM), random access memory (RAM), ternary content-addressable memory (TCAM), and/or static random-access memory (SRAM).

Figure 6:
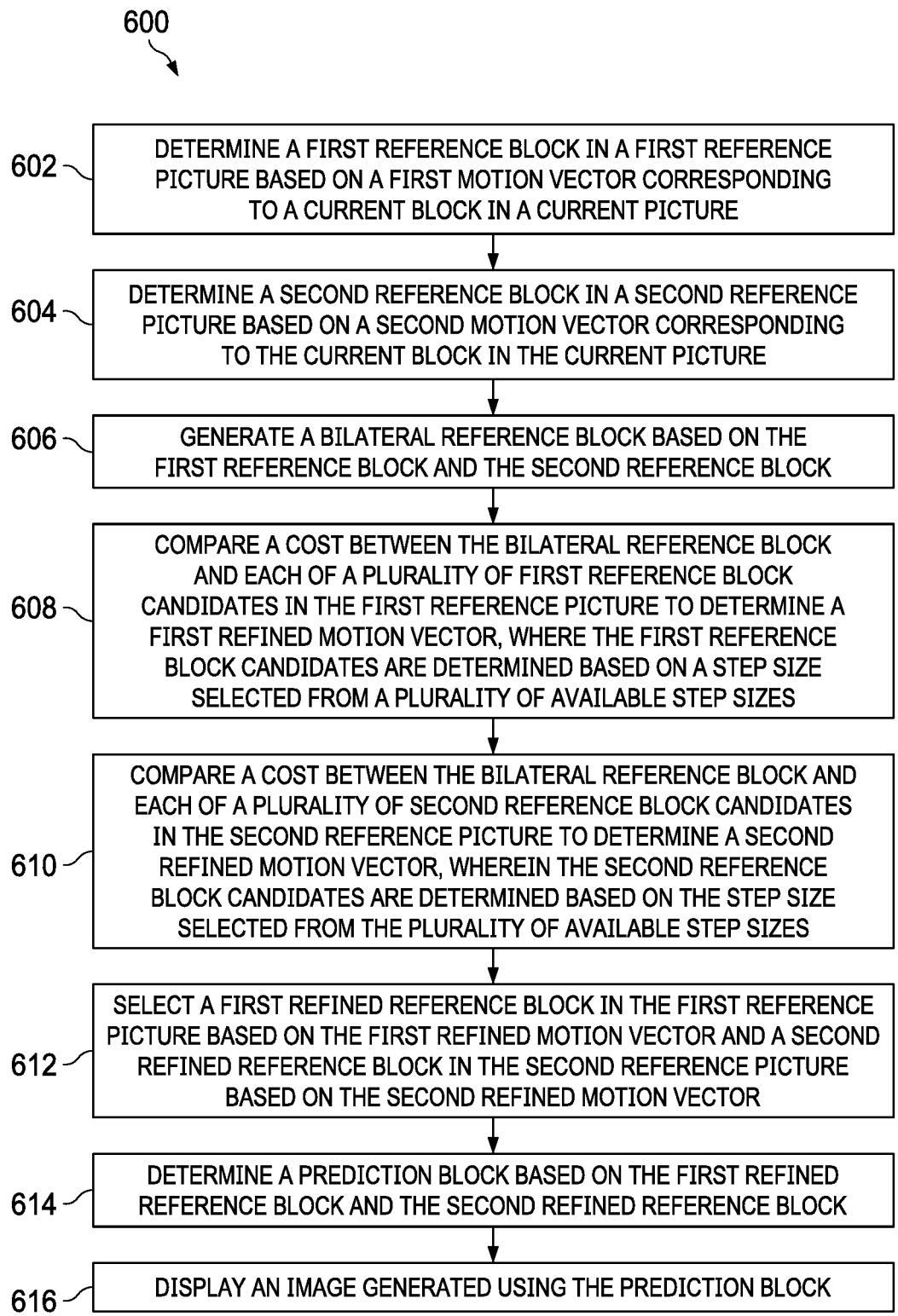
FIG. 6 is a flowchart illustrating an embodiment of a coding method.

FIG. 6 is a flowchart illustrating an embodiment of a coding method 600. In an embodiment, the coding method 600 is implemented in a decoder such as the video decoder 30 in FIG. 1. The coding method 600 may be implemented when, for example, a bitstream received from an encoder, such as the video encoder 20 of FIG. 1, is to be decoded in order to generate an image on the display of an electronic device. The coding method 600 will be described with reference to the elements identified in FIG. 4.

In block 602, a first reference block (e.g., reference block 406) in a first reference picture (e.g., reference picture 408) is determined based on a first motion vector (e.g., MV0) corresponding to a current block (e.g., current block 402) in a current picture (e.g., current picture 404). In block 604, a second reference block (e.g., reference block 410) in a second reference picture (e.g., reference picture 412) is determined based on a second motion vector (e.g., MV1) corresponding to the current block (e.g., current block 402) in the current picture (e.g., current picture 404).

In block 606, a bilateral reference block (e.g., bi-lateral reference block 414) is generated based on the first reference block and the second reference block. In an embodiment, the bilateral reference block is obtained using a weighted average of the first reference block and the second reference block.

In block 608, a cost comparison between the bilateral reference block and each of a plurality of first reference block candidates in the first reference picture is performed. The first reference block candidates may be, for example, the various reference blocks surrounding the first reference block 406 in the first reference picture 408. The cost comparison is used to determine a first refined motion vector (e.g., MV0'). In an embodiment, the first reference block candidates are determined based on a step size that was selected from a plurality of available step sizes (e.g., ⅛, ¼, ½, 1, and so on).

In block 610, a cost comparison between the bilateral reference block and each of a plurality of second reference block candidates in the second reference picture is performed. The second reference block candidates may be, for example, the various reference blocks surrounding the second reference block 410 in the second reference picture 412. The cost comparison is used to determine a second refined motion vector (e.g., MV1'). In an embodiment, the second reference block candidates are determined based on a step size that was selected from the plurality of available step sizes (e.g., ⅛, ¼, ½, 1, and so on).

In block 612, a first refined reference block (e.g., refined reference block 416) in the first reference picture is selected based on the first refined motion vector and a second refined reference block (e.g., refined reference block 418) in the second reference picture is selected based on the second refined motion vector.

In block 614, a prediction block (e.g., prediction block 420) is determined based on the first refined reference block and the second refined reference block. In block 616, an image generated using the prediction block is displayed on the display of an electronic device.

Figure 7:
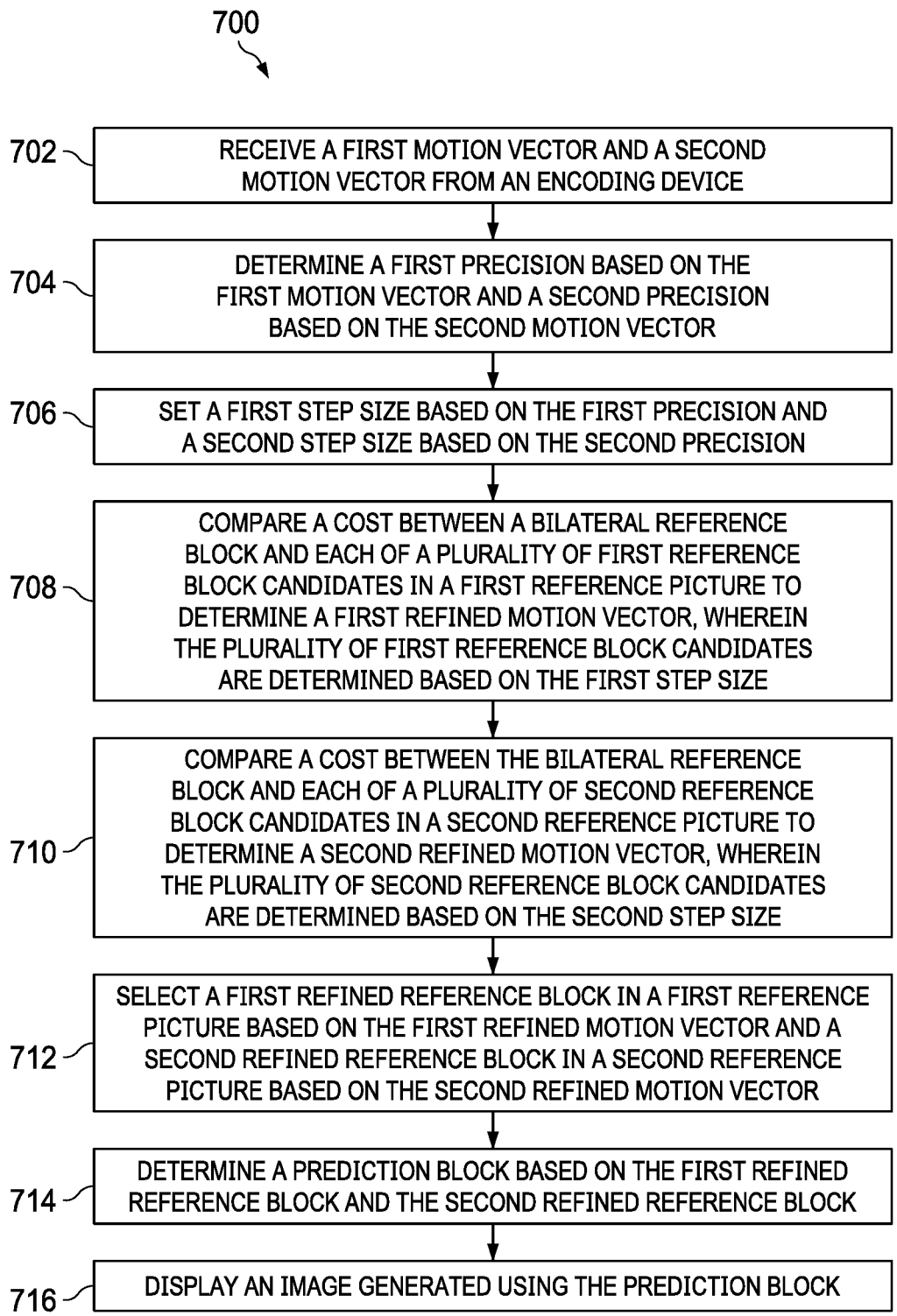
FIG. 7 is a flowchart illustrating an embodiment of a coding method.

FIG. 7 is a flowchart illustrating an embodiment of a coding method 700. In an embodiment, the coding method 700 is implemented in a decoder such as video decoder 30 in FIG. 1. The coding method 700 may be implemented when, for example, a bitstream received from an encoder, such as the video encoder 20 of FIG. 1, is to be decoded in order to generate an image on the display of an electronic device. The coding method 700 will be described with reference to the elements identified in FIG. 4.

In block 702, a first motion vector (e.g., MV0) and a second motion vector (e.g., MV1) are received from an encoding device. The first motion vector and the second motion vector may be received within a bitstream. In block 704, a first precision is determined based on the first motion vector and a second precision is determined based on the second motion vector. The first and/or second precision may be a finest precision, a coarsest precision, and so on as described herein.

In block 706, a first step size (e.g., ⅛, ¼, ½, 1, and so on) is set based on the first precision and a second step size (e.g., ⅛, ¼, ½, 1, and so on) is set based on the second precision. In an embodiment, the first and second step sizes are derived or otherwise obtained from the first and second precision, respectively.

In block 708, a comparison cost between a bilateral reference block and each of a plurality of first reference block candidates in a first reference picture is performed to determine a first refined motion vector (e.g., MV0'). In an embodiment, the first reference block candidates are determined based on the first step size.

In block 710, a comparison cost between the bilateral reference block and each of a plurality of second reference block candidates in a second reference picture is performed to determine a second refined motion vector (e.g., MV1'). In an embodiment, the second reference block candidates are determined based on the second step size.

In block 712, a first refined reference block in a first reference picture is selected based on the first refined motion vector and a second refined reference block in a second reference picture is selected based on the second refined motion vector.

In block 714, a prediction block (e.g., prediction block 420) is determined based on the first refined reference block and the second refined reference block. In block 716, an image generated using the prediction block is displayed on the display of an electronic device.

Based on the foregoing, those skilled in the art will recognize that existing solutions mandate use of a single step size of one. In contrast, the present disclosure presents a set of available step sizes that may be selected and used. In addition, the present disclosure presents methods of deriving the step size from the precision identified in the bitstream. Therefore, the step size need not be transmitted from the encoder to the decoder.

A method of coding implemented by a decoding means. The method comprising determining a first reference block in a first reference picture based on a first motion vector corresponding to a current block in a current picture; determining a second reference block in a second reference picture based on a second motion vector corresponding to the current block in the current picture; generating a bilateral reference block based on the first reference block and the second reference block; comparing a cost between the bilateral reference block and each of a plurality of first reference block candidates in the first reference picture to determine a first refined motion vector, wherein the first reference block candidates are determined based on a step size selected from a plurality of available step sizes; comparing a cost between the bilateral reference block and each of a plurality of second reference block candidates in the second reference picture to determine a second refined motion vector, wherein the second reference block candidates are determined based on the step size selected from the plurality of available step sizes; selecting a first refined reference block in the first reference picture based on the first refined motion vector and a second refined reference block in the second reference picture based on the second refined motion vector; determining a prediction block based on the first refined reference block and the second refined reference block; and displaying, on a display of a display means, an image generated using the prediction block.

A method of coding implemented by a decoding means. The method comprising receiving a first motion vector and a second motion vector from an encoding device; determining a first precision based on the first motion vector and a second precision based on the second motion vector; setting a first step size based on the first precision and a second step size based on the second precision; and comparing a cost between a bilateral reference block and each of a plurality of first reference block candidates in a first reference picture to determine a first refined motion vector, wherein the plurality of first reference block candidates are determined based on the first step size; comparing a cost between the bilateral reference block and each of a plurality of second reference block candidates in a second reference picture to determine a second refined motion vector, wherein the plurality of second reference block candidates are determined based on the second step size; selecting a first refined reference block in a first reference picture based on the first refined motion vector and a second refined reference block in a second reference picture based on the second refined motion vector; determining a prediction block based on the first refined reference block and the second refined reference block; and displaying, on a display of a display means, an image generated using the prediction block.

A coding device comprising a memory means storing instructions; and a processing means coupled to the memory means. The processing means is configured to execute the instructions stored in the memory means to cause the processing means to: determine a first reference block in a first reference picture based on a first motion vector corresponding to a current block in a current picture; determine a second reference block in a second reference picture based on a second motion vector corresponding to the current block in the current picture; generate a bilateral reference block based on the first reference block and the second reference block; compare a cost between the bilateral reference block and each of a plurality of first reference block candidates in the first reference picture to determine a first refined motion vector, wherein the first reference block candidates are determined based on a step size selected from a plurality of available step sizes; compare a cost between the bilateral reference block and each of a plurality of second reference block candidates in the second reference picture to determine a second refined motion vector, wherein the second reference block candidates are determined based on the step size selected from the plurality of available step sizes; select a first refined reference block in the first reference picture based on the first refined motion vector and a second refined reference block in the second reference picture based on the second refined motion vector; determine a prediction block based on the first refined reference block and the second refined reference block; and a display means coupled to the processing means, the display means configured to display an image generated using the prediction block.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of coding implemented by a decoding device, comprising:
   determining a first reference block in a first reference picture based on a first motion vector corresponding to a current block in a current picture;
   determining a second reference block in a second reference picture based on a second motion vector corresponding to the current block in the current picture;
   generating a bilateral reference block based on the first reference block and the second reference block;
   comparing a cost between the bilateral reference block and each of a plurality of first reference block candidates in the first reference picture to determine a first refined motion vector, wherein the first reference block candidates are determined based on a step size selected from a plurality of available step sizes;
   comparing a cost between the bilateral reference block and each of a plurality of second reference block candidates in the second reference picture to determine a second refined motion vector, wherein the second reference block candidates are determined based on the step size selected from the plurality of available step sizes;
   selecting a first refined reference block in the first reference picture based on the first refined motion vector and a second refined reference block in the second reference picture based on the second refined motion vector;
   determining a prediction block based on the first refined reference block and the second refined reference block; and
   displaying, on a display of an electronic device, an image generated using the prediction block.

2. The method of claim 1, wherein the plurality of available step sizes includes two or more luma sample offsets, wherein the luma sample offsets comprise fractional offsets, integer offsets, or a combination of fractional and integer offsets.

3. The method of claim 1, wherein the plurality of available step sizes comprises $\frac{1}{8}$, $\frac{1}{4}$, $\frac{1}{2}$, 1, and N luma sample offsets, where N is any positive integer.

4. The method of claim 1, wherein the step size is any one of $\frac{1}{8}$, $\frac{1}{4}$, $\frac{1}{2}$, 1, and N luma sample offsets, where N is any positive integer.

5. The method of claim 1, wherein the step size is obtained from a codec default.

6. The method of claim 1, wherein the step size is configured to be obtained from any one of a sequence parameter set (SPS) level of a bitstream, a picture parameter set (PPS) level of the bitstream, a slice header, coding tree unit (CTU) syntax, or coding unit (CU) syntax.

7. The method of claim 1, wherein the plurality of first reference block candidates and the plurality of second reference block candidates are determined as follows:

$$MV0x'=MV0x+k*step\_size;$$

$$MV0y'=MV0y+k*step\_size;$$

$$MV1x'=MV1x+k*step\_size;$$

$$MV1y'=MV1y+k*step\_size;$$

where MV0x and MV1x indicate a motion vector in an x-direction, MV0y and MV1y indicate the motion vector in a y-direction, k is an integer used to represent coordinates, and step_size is the step size.

8. The method of claim 1, wherein one or more of the first motion vector and the second motion vector are rounded prior to the first refined motion vector and the second refined motion vector being determined.

9. A method of coding implemented by a decoding device, comprising:
   receiving a first motion vector and a second motion vector from an encoding device;
   determining a first precision based on the first motion vector and a second precision based on the second motion vector;
   setting a first step size based on the first precision and a second step size based on the second precision;
   comparing a cost between a bilateral reference block and each of a plurality of first reference block candidates in a first reference picture to determine a first refined motion vector, wherein the plurality of first reference block candidates are determined based on the first step size;

comparing a cost between the bilateral reference block and each of a plurality of second reference block candidates in a second reference picture to determine a second refined motion vector, wherein the plurality of second reference block candidates are determined based on the second step size;

selecting a first refined reference block in a first reference picture based on the first refined motion vector and a second refined reference block in a second reference picture based on the second refined motion vector;

determining a prediction block based on the first refined reference block and the second refined reference block; and displaying, on a display of an electronic device, an image generated using the prediction block.

10. The method of claim 9, wherein the first precision is a finest precision of the first motion vector and the second precision is a finest precision of the second motion vector.

11. The method of claim 9, wherein the first precision is a coarsest precision of the first motion vector and the second precision is a coarsest precision of the second motion vector.

12. The method of claim 9, wherein the first precision is a finest precision of the first motion vector and the second motion vector, and wherein the second precision is the finest precision of the first motion vector and the second motion vector.

13. The method of claim 9, wherein the first precision is a coarsest precision of the first motion vector and the second motion vector, and wherein the second precision is the coarsest precision of the first motion vector and the second motion vector.

14. The method of claim 9, wherein the first step size and the second step size are both one of ⅛, ¼, ½, 1, and N luma sample offsets, where N is any positive integer.

15. The method of claim 14, wherein the first step size and the second step size correspond to a finest precision of the first motion vector and the second motion vector in both an x-direction and a y-direction.

16. The method of claim 14, wherein the first step size and the second step size correspond to a coarsest precision of the first motion vector and the second motion vector in both an x-direction and a y-direction.

17. A coding device, comprising:
a memory storing instructions; and
a processor coupled to the memory, the processor configured to execute the instructions stored in the memory to cause the processor to:

determine a first reference block in a first reference picture based on a first motion vector corresponding to a current block in a current picture;

determine a second reference block in a second reference picture based on a second motion vector corresponding to the current block in the current picture;

generate a bilateral reference block based on the first reference block and the second reference block;

compare a cost between the bilateral reference block and each of a plurality of first reference block candidates in the first reference picture to determine a first refined motion vector, wherein the first reference block candidates are determined based on a step size selected from a plurality of available step sizes;

compare a cost between the bilateral reference block and each of a plurality of second reference block candidates in the second reference picture to determine a second refined motion vector, wherein the second reference block candidates are determined based on the step size selected from the plurality of available step sizes;

select a first refined reference block in the first reference picture based on the first refined motion vector and a second refined reference block in the second reference picture based on the second refined motion vector;

determine a prediction block based on the first refined reference block and the second refined reference block; and a display coupled to the processor, the display configured to display an image generated using the prediction block.

18. The coding device of claim 17, wherein the plurality of available step sizes includes two or more luma sample offsets, wherein the luma sample offsets comprise fractional offsets, integer offsets, or a combination of fractional and integer offsets.

19. The coding device of claim 17, wherein the plurality of available step sizes comprises ⅛, ¼, ½, 1, and N luma sample offsets, where N is any positive integer.

20. The coding device of claim 17, wherein the step size is any one of ⅛, ¼, ½, 1, and N luma sample offsets, where N is any positive integer.

* * * * *